United States Patent [19]

Adams

[11] Patent Number: 5,700,767
[45] Date of Patent: Dec. 23, 1997

[54] DOWNHOLE WELL LUBRICANT

[75] Inventor: Ernest K. Adams, San Patricio County, Tex.

[73] Assignee: CJD Investments, Inc., Corpus Christi, Tex.; a part interest

[21] Appl. No.: 531,795

[22] Filed: Sep. 21, 1995

[51] Int. Cl.$^6$ ................... C10M 129/00; C10M 133/04
[52] U.S. Cl. ................ 508/539; 508/545; 507/225; 507/248; 507/265
[58] Field of Search .................. 252/35, 21, 27, 252/28, 50; 507/248, 265, 225; 508/545, 539

[56] References Cited

U.S. PATENT DOCUMENTS

| | | | |
|---|---|---|---|
| 2,247,577 | 7/1941 | Flaxman | 508/250 |
| 2,628,197 | 2/1953 | Killingsworth | 508/143 |
| 2,649,415 | 8/1953 | Sundberg | 507/248 |
| 2,882,171 | 4/1959 | Denman | 507/248 |
| 2,952,635 | 9/1960 | Spivack | 507/248 |
| 3,217,802 | 11/1965 | Reddie . | |
| 4,207,193 | 6/1980 | Ford et al. | 507/248 |
| 4,491,181 | 1/1985 | Krol . | |
| 4,964,615 | 10/1990 | Mueller . | |
| 5,045,219 | 9/1991 | Trahan . | |
| 5,127,475 | 7/1992 | Hayes . | |
| 5,247,992 | 9/1993 | Lockhart . | |
| 5,415,230 | 5/1995 | Frisk . | |
| 5,460,737 | 10/1995 | Sakai et al. | 508/216 |

OTHER PUBLICATIONS

Kirk–Othmer, Encyclopedia of Chemical Technology, Lubricants, vol. 14, Wiley New York, 1981 p. 502.

*Primary Examiner*—Jacqueline V. Howard
*Assistant Examiner*—Cephia D. Toomer
*Attorney, Agent, or Firm*—G. Turner Moller

[57] ABSTRACT

A downhole well lubricant includes at least about 50#/bbl of a surfactant, preferably at least about 10#/bbl of a viscosifier, the balance being about 20–50% filming amine, 20–80% activator, balance being a diluent. The activator is VARSOL, coconut oil, terpene, xylene, mineral oil, turpentine, d-limonene and mixtures thereof. The surfactant is a stearate, preferably aluminum stearate, and the viscosifier is an oil compatible bentonite or polyacrylamide polymer. The resultant product is a thin pigmented solution of low viscosity. When the lubricant is dispersed in a water based drilling or completion fluid, the filming amine is attracted to and coats metal in the well. When the metal rubs against anything, such as coiled tubing rubbing against the side of the production string, a lubricious emulsion is created on the metal at locations where it is rubbing against something.

8 Claims, No Drawings

DOWNHOLE WELL LUBRICANT

This invention relates to a lubricant used in downhole well applications.

BACKGROUND OF THE INVENTION

There are many situations where lubricants are added to drilling or completion fluids in the drilling, completion or reworking of hydrocarbon producing wells. For example, there was a time when 2% diesel was added to drilling mud to provide lubricity and increase penetration rate. More recently, more sophisticated lubricants are added to drilling fluids to increase penetration rate. In addition, lubricants are added to a drilling fluid when drilling horizontal wells to reduce drag on the drill string and to lubricate down hole motors. Similarly, lubricants may be added to a completion fluid to reduce drag on coiled tubing being run into a deep well. Another example is the use of a lubricant in drilling or completion fluids to unstick drill pipe, coiled tubing or other work string.

In particular, there is a need for a reliable, inexpensive lubricant to be used in conjunction with coiled tubing. Coiled tubing is notorious for getting stuck for a variety of reasons and cannot be easily unstuck because one cannot pull very hard on coiled tubing. One inch diameter coiled tubing fails in tension at about 22,000#. One must then fish the parted coiled tubing out the hole, usually in 20–30' sections. Not only is the fishing job expensive, but the operator must also buy the ruined tubing string. Thus, there is a need for a reliable, inexpensive lubricant to be used to lubricate stuck coiled tubing and to be placed in completion fluid to prevent coiled tubing from sticking.

The prior art is replete with lubricant compositions for releasing differentially stuck drill pipe as shown in U.S. Pat. Nos. 3,217,802; 4,491,181; 4,964,615; 5,045,219; 5,127,475; 5,247,992; and 5,415,230.

SUMMARY OF THE INVENTION

The lubricant of this invention is a surfactant such as a soap, a filming amine, and an activator. Preferably, a viscosifier and a diluent are employed.

The filming amine has an affinity for metal and effectively coats metal in the well. Filming amines are widely used as corrosion inhibitors. Those skilled in the art recognize that corrosion inhibitors have the property of coating or plating onto metal surfaces and thereby protect the metal surface from corrosion. In this invention, the filming amine coats metal surfaces in the well and acts as a carrier of the surfactant and the activator. When added to a water based drilling or completion fluid, the lubricant disperses but shortly coats the metal surfaces in the well. When the outside surface of a coiled tubing string, for example, rubs against the inside surface of a production string, a greasy lubricious emulsion forms on the both surfaces. The longer the surfaces are rubbed together, the more emulsion is created. The emulsion lubricates the coiled tubing and the inside of the production string thereby reducing drag between them.

The surfactant of this invention is capable of emulsifying with the filming amine to produce a greasy lubricious material on metal surfaces in the well. A suitable material is a soap, preferably one of the stearate family such as aluminum stearate. The activator of this invention is selected from VARSOL, coconut oil, terpene, xylene, toluene, benzene, mineral oil, turpentine, d-limonene and mixtures thereof.

The viscosifier of this invention prevents stratification of the lubricant in storage and is oil compatible, such as an oil compatible bentonite known as in the drilling business as oil mud gel. The lubricant of this invention preferably includes a diluent such as diesel, gasoline, naphtha, fuel oil, vegetable oil, coconut oil and the like.

The lubricant of this invention can be used in many other downhole applications, such as lubricating drill pipe and downhole motors to reduce drag while drilling horizontal well sections, freeing stuck drill pipe or other work strings and the like.

It is accordingly an object of this invention to provide an improved lubricant suitable for use in hydrocarbon wells.

Another object of this invention is to provide a lubricant which is added to a drilling or completion fluid, which coats metal parts in the well and which is converted by rubbing into a greasy lubricious emulsion adhering to the metal parts at the site of the rubbing.

A further object of this invention is to provide an improved lubricant incorporating a filming amine, a surfactant and an activator.

Other objects and advantages of this description will become more apparent as this description proceeds, reference being made to the accompanying drawings and appended claims.

DETAILED DESCRIPTION

The lubricant of this invention is the combination of a surfactant, a filming amine, an activator and preferably a viscosifier and a diluent.

The surfactant is preferably a soap such as one of the stearate family such as aluminum stearate. The exact amount of surfactant depends somewhat on the circumstances but is normally in the range of 20–70#/bbl, with 50#/bbl being a preferred concentration.

The viscosifier is used to prevent stratification of the lubricant in storage and is an oil compatible material such as an oil compatible bentonite of the type used in oil based muds. The standard viscosifier used in oil based muds or synthetic based muds is specially treated organophillic bentonite which is often called oil mud gel. Organic polymers, such as Alcomer 274, available from Allied Colloids, Inc. of Suffolk, Va. are also commonly used. These polymers are polyacrylimides. Bentonite is a naturally occurring swellable clay and has been used for decades as the standard viscosifier in water based drilling muds. It can be treated to swell in oil as well as water. The standard purpose of raising viscosity is to enable a drilling fluid to carry cuttings upwardly in the hole. In this invention, the viscosifier acts to prevent stratification of the lubricant in storage and to interact with the surfactant to form a stronger lubricant bond on metal surfaces.

The balance of the lubricant of this invention is 20–50% of a filming amine, 20–80% of an activator and balance diluent. The filming amine is typically a corrosion inhibitor or a constituent thereof and acts to plate out or coat metal surfaces, particularly those suspended in a water based mixture. A suitable corrosion inhibitor for use in this invention is known as Arcor 233 available from Baker Performance Chemicals, Dayton, Tex. Other concentrated corrosion inhibitors are also suitable, such as Corehib.

The activator is selected from the group consisting of VARSOL, coconut oil, terpene, xylene, toluene, benzene, mineral oil, turpentine, d-limonene and mixtures thereof. VARSOL is a petroleum solvent and is a mixture of C7–C10 saturated hydrocarbons 1, 2, 4 Trimethylbenzene and C8+ aromatics as shown in a Material Safety Data Sheet publication of Exxon Company USA issued Apr. 12, 1995. The exact manner in which the activator functions is not known but it is known that lubricants prepared without it do not produce the greasy lubricious emulsion on metal surfaces in response to rubbing between the metal surfaces that is characteristic of the lubricant of this invention.

The balance of the invention is a preferably a liquid diluent, such as diesel fuel, fuel oil, gasoline, naphtha, JP-4, kerosene, and the like. JP-4 is a jet fuel as shown in McGraw-Hill Encyclopedia of Science & Technology, 1992, Volume 9, pp 473–474.

The resultant liquid is a thin colored solution. In a drilling operation, fifteen to twenty gallons of lubricant are mixed with 30–40 barrels of drilling fluid in a slug tank or slug pit. The lubricant of this invention is preferably not added through the mud hopper because it will cause foaming. Preferably, the lubricant is poured into the slug tank or pit and agitated for a minute or two before pumping into the well. Lubricant is added to the mud system until the concentration is 10–20 gallons per 100 barrels of mud.

For daily maintenance in a drilling operation, 10–20 gallons are added per tower. Two or three gallons can be added in full strength down the drill pipe on every connection or by injecting the lubricant into the pump suction at a rate of 2–3 gallons per connection. To increase penetration rates in a horizontal hole section, up to fifty gallons may be necessary before an increase in penetration rate is noted.

When the lubricant is dispersed in a water based drilling or completion fluid, the filming amine is attracted to the metal surfaces, such as drill pipe or coiled tubing, just like a corrosion inhibitor would be. The filming amine carries with it the surfactant and the activator. When the coiled tubing rubs against the inside of the production string or anything else, a greasy emulsion is produced on the metal. The more the surfaces are rubbed together, the more grease is created. The emulsion is mainly the surfactant, water from the completion fluid and some of the activator.

If the lubricant is added to the water based drilling or completion fluid before going in the hole, there is much less drag on the work string because the emulsion lubricates between the sliding parts. If the lubricant is not added to the drilling or completion fluid until the work string is stuck, the lubricant is circulated into the well and the work string is worked up and down. The up and down movement of the work string creates the emulsion, lubricates the work string where movement occurs and gradually frees the work string.

EXAMPLE 1

One 55 gallon drum of Arcor 233 is mixed with one 55 gallon drum of xylene and one 55 gallon drum of diesel. 200# of powdered aluminum stearate and 40# of oil mud gel are added to the mixture, stirring to suspend the aluminum stearate and oil mud gel. The total volume of the mixture is about four barrels of forty two gallons each. The resultant liquid is a thin solution of a medium dark brown color. When one dips the thumb and forefinger in the solution and rubs them together under a running stream of tap water, a thick greasy emulsion forms on the fingers.

A string of coiled tubing is run inside a string of 2⅞" O.D. casing a well in the Parker & Parlsey #7 Hathaway in Lavaca County, Tex. At 13,400', the weight shown on the weight indicator is 23,000#, which is much more than the string weight, suggesting that the coiled tubing is abnormally rubbing against the side of the casing. During operations to circulate sand out of the well, the coiled tubing becomes stuck. The coiled tubing string is worked up and down for three days by pulling on it and then releasing tension, to no avail. The lubricant of this example is pumped through the coiled tubing into the well. The coiled tubing string is worked up and down by pulling on it with the winch and then relaxing. The tubing string shortly shows signs of freeing up because it can be moved more-and-more by pulling. Shortly, it comes loose. When pulled out of the well, the tubing string is covered in parts by a greasy lubricious emulsion.

EXAMPLE 2

The Parker & Parsley #1-H Hyul in Burleson County, Texas is drilling in a horizontal section and showing signs of a great deal of bore hole friction, i.e. when picking up, the weight indicator is reading 90,000# over string weight, the torque is running at 3400 ft-lb and the penetration rate is only 1'/hour. The lubricant of Example 1 is added to the drilling fluid. Very shortly, the weight indicator drops to 10,000# over string weight, the torque drops to 1400 ft-lb and the penetration rate increases to 35'/hour. When pulled from the well and before going through the drill pipe wiper, a greasy emulsion can be detected on the drill string.

EXAMPLE 3

One 55 gallon drum of Arcor 233, 40 gallons of diesel and 60 gallons of toluene are mixed together. 300# of aluminum stearate and 55# of oil mud gel are added to the mixture, stirring to suspend the aluminum stearate and oil mud gel, making somewhat less than four barrels. The resultant liquid is a thin slightly colored solution. When one dips the thumb and forefinger in the solution and rubs them together under a running stream of tap water, a greasy emulsion forms on the fingers.

EXAMPLE 4

Fifty gallons of gasoline, 50 gallons of Arcor 233 and 40 gallons of benzene are mixed together. 300# of aluminum stearate and 55# of oil mud gel are added to the mixture, stirring to suspend the aluminum stearate and oil mud gel. The resultant liquid is a thin slightly colored solution that is lubricious on rubbing.

EXAMPLE 5

Fifty gallons of terpene, 50 gallons of Arcor 233 and 40 gallons of fuel oil are mixed together. 150# of aluminum stearate and 20# of oil mud gel are added to the mixture, stirring to suspend the surfactant and oil mud gel. The resultant liquid is a thin slightly colored solution that is lubricious on rubbing.

EXAMPLE 6

Fifty gallons of terpene, 50 gallons of Arcor 233 and 40 gallons of fuel oil are mixed together. 150# of aluminum stearate and 20# of oil mud gel are added to the mixture, stirring to suspend the surfactant and oil mud gel. The resultant liquid is a thin slightly colored solution that is lubricious on rubbing.

EXAMPLE 7

Fifty gallons of Arcor 233, 40 gallons of VARSOL and 40 gallons of fuel oil are mixed together. 250# of aluminum stearate is added to the mixture, stirring to suspend the surfactant. The resultant liquid is a thin slightly colored solution that is lubricious on rubbing.

EXAMPLE 8

Fifty gallons of xylene and fifty gallons of Arcor 233 are mixed together. 225# of aluminum stearate is added to the mixture, stirring to suspend the surfactant. The resultant liquid is a thin slightly colored solution that is lubricious on rubbing.

EXAMPLE 9

One hundred gallons of terpene and 50 gallons of Arcor 233 are mixed together. 150# of aluminum stearate and 20# of oil mud gel are added to the mixture, stirring to suspend the surfactant and oil mud gel. The resultant liquid is a thin slightly colored solution that is lubricious on rubbing. This composition is particularly desirable for use in weighted drilling fluids. It is believed due to the higher concentration of activator.

EXAMPLE 10

In working over the Parker & Parsley #1 Veselka in Bayou Bouillion Field, Abbeyville Parish, La., 2⅞" tubing was stuck inside 5½" casing in a 9800' directional well and could not be retrieved by working the tubing up and down. The lubricant of this invention was pumped into the well until the lubricant was displaced upwardly past the stuck point. The tubing was worked up and down and shortly came free.

EXAMPLE 11

In working over the Parker & Parsley Clayton Field Block 85-2 in Live Oak County, Texas, 1" coiled tubing was stuck inside a 2⅞" production string. The coiled tubing was worked up and down within limits imposed by the tensile strength of the tubing and could not be freed. A lubricant of this invention was pumped into the coiled tubing and it became free after four hours of working.

EXAMPLE 12

The Cody Energy #1 McCallum Smith Unit was being drilled horizontally in Brazos County, Texas at 12,200" where the hole is horizontal 92°. The drill pipe could not be rotated because of high torque and the drill pipe would not slide because of high drag. A lubricant of this invention was added to the drilling fluid and pumped through the drill pipe. The torque decreased to normal and drilling began. The penetration rate increased from zero to a range of 35–45'/ hour to finish the well.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A downhole well lubricant having the properties of coating metal surfaces submerged in a water based well liquid and, in response to friction between the coated metal surfaces submerged in the water based well liquid, producing a greasy water based emulsion on the metal surfaces, the lubricant consisting essentially of 20–70 pounds per barrel of a stearate surfactant; and
   liquid component being
      20–50% of a filming amine;
      20–80% of an activator selected from the group consisting of petroleum solvent comprising a mixture of C7–C10 saturated hydrocarbons, 1, 2, 4 trimethylbenzene and C8+ aromatics; coconut oil; terpene; xylene; toluene; benzene; mineral oil; turpentine; and mixtures thereof,
      balance diluent.

2. The downhole well lubricant of claim 1 wherein the surfactant is aluminum stearate.

3. The downhole well lubricant of claim 1 wherein the stearate is in a concentration of at least about 50 pounds per barrel.

4. The downhole well lubricant of claim 1 wherein the filming amine is a corrosion inhibitor.

5. The downhole well lubricant of claim 4 wherein the diluent is a liquid hydrocarbon.

6. The downhole well lubricant of claim 5 wherein the liquid hydrocarbon is selected from the group consisting of naphtha, jet fuel, kerosene, gasoline, diesel and fuel oil.

7. A downhole well lubricant having the properties of coating metal surfaces submerged in a water based well liquid and, in response to friction between the coated metal surfaces submerged in the water based well liquid, producing a greasy water based emulsion on the metal surfaces, the lubricant consisting essentially of 20–70 pounds per barrel of a surfactant;
   5–15 pounds per barrel of a viscosifier; and
   a liquid component being
      50% of a filming amine;
      20–80% of an activator selected from the group consisting of petroleum solvent comprising a mixture of C7–C10 saturated hydrocarbons, 1, 2, 4 trimethylbenzene and C8+ aromatics; coconut oil; terpene; xylene; toluene; benzene; mineral oil; turpentine; and mixtures thereof,
      balance diluent.

8. The downhole well lubricant of claim 7 wherein the viscosifier is selected from the group consisting of oil compatible bentonite and polyacrylamide.

* * * * *